FIG. 2

FIG. 2A

United States Patent Office 2,860,478
Patented Nov. 18, 1958

2,860,478

RAKING DEVICE WITH A RAKING MEMBER ADAPTING ITSELF TO THE GROUND

Cornelis van der Lely and Ary van der Lely, Maasland, Netherlands, assignors, by mesne assignments, to C. van der Lely Canada Ltd., Ottawa, Ontario, Canada, a corporation of Canada Application November 9, 1953, Serial No. 390,981

Claims priority, application Netherlands October 16, 1953

20 Claims. (Cl. 56—377)

This invention relates to raking members, and more particularly to raking members for use in raking devices of the kind having a mobile frame and at least one substantially horizontal axle upon which a raking member is mounted at an angle to the direction of movement of the frame. The raking member, in a device of the described character is rotated by its contact with the ground and/or rakable substance lying thereon during the movement of the mobile frame, and the periphery of each raking member has teeth for moving rakable substance over the ground, such teeth being mounted to permit deflection of at least a part thereof when the teeth are under load.

In existing raking devices of the kind described above, means are provided which permit variation of the elevation of the axle carrying the raking member with regard to the frame, for example, the axle may be formed by the crankpin of a crank rotatably mounted on the frame. The use of such an arrangement in a device having a plurality of raking members arranged in a row will permit the individual raking members in the row to adjust themselves with respect to their elevation, so that the row of raking members can adapt itself to substantial unevenness in the terrain being traversed. The existing devices depend upon deflection of the circumferential teeth of the raking members for their adaptation to small irregularities or uneveness in the terrain. However, when the teeth of the existing raking members undergo even a relatively small deflection, the teeth either completely, or to at least some extent, lose their ability to displace the substance lying on the ground in the desired direction by reason of the fact that the deflected teeth tend to pass over the rakable substance.

Accordingly, an object of this invention is to provide raking members or raking wheels, particularly adapted for use on a raking device of the described character, and having teeth which are able to deflect individually to large extent without losing or diminishing their ability to carry along the rakable substance.

In accordance with the invention, the above objective is realized by providing means which retain the teeth of the raking member in a favorable position to perform their raking function, whether the teeth are in a normal condition, or in a substantially deflected condition.

As a result of the above characteristic of raking wheels embodying this invention, the following advantages are obtained:

(a) The raking wheels provide a more efficient raking operation resulting in a smaller loss of the rakable substance or material since less of the material will remain on the ground following the passage of the raking device over the latter;

(b) Very uneven terrain may be worked effectively;

(c) In working an area of the terrain having a predetermined width, the raking device may include a smaller number of raking members or wheels than would be necessary in raking devices including conventional raking members, since each raking member embodying the present invention has a greater active working width than the raking members of known construction, whereby the raking device will be relatively inexpensive;

(d) The axles of the raking members may be rigidly secured to the frame of the raking device since the adaptation of the raking members to the contours of the ground can be effected solely by deflection of the teeth, rather than by bodily displacement of the raking members, as heretofore.

Still further objects, features, advantages and details of the present invention will appear in the following description which is to be read in connection with the accompanying drawing, in which various embodiments of the invention have been illustrated by way of example, and wherein.

Referring to the drawings in detail, and initially to

Figure 1:
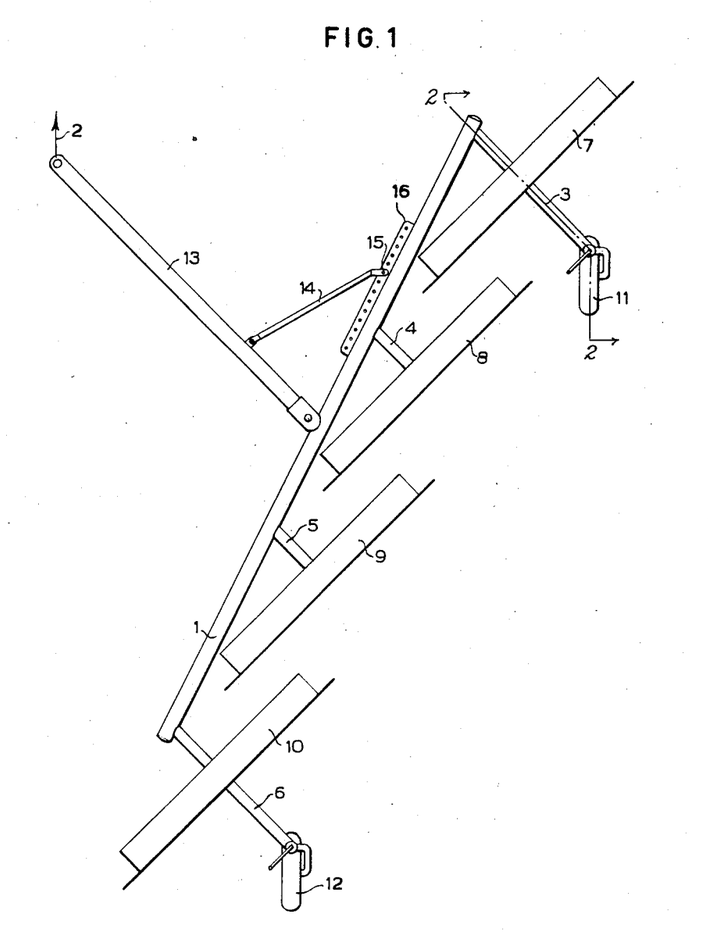
Fig. 1 is a top plan view of a raking device of the kind on which raking members embodying the present invention are to be used.

Fig. 1 thereof, a side delivery rake of the kind on which raking members constructed in accordance with the present invention are to be employed, is there shown to include a frame formed by an elongated beam 1 extending obliquely with respect to the normal direction of movement of the device, as indicated by the arrow 2. Four parallel axles 3, 4, 5 and 6 are rigidly secured to the beam 1 and extend substantially horizontally. The axles 3, 4, 5 and 6 carry rotatable raking members 7, 8, 9 and 10, respectively, various embodiments of which are hereinafter described in detail. The end axles 3 and 6 respectively carry running wheels 11 and 12 which support the frame and maintain the latter at a predetermined elevation above the ground. The wheels 11 and 12 are preferably self-adjusting or swivel wheels which may, if desired, be locked in any position. An adjustable draw arm 13 is hingedly connected to the beam 1 for rotation, relative to the latter, in a substantially horizontal plane, and the arm 13 may be locked in any desired angular position relative to the beam 1 by means of a rod 14 which is hingedly connected to the arm 13, at one of its ends, and has an aperture 15 at its free end. The rod 14 may be arranged with its aperture 15 above any of the corresponding apertures provided in a member 16 secured to the beam 1, and the rod 14 may be secured in position by means of a pin or bolt extending through the aperture of the rod 14 and the aligned aperture of the member 16.

Figure 2:
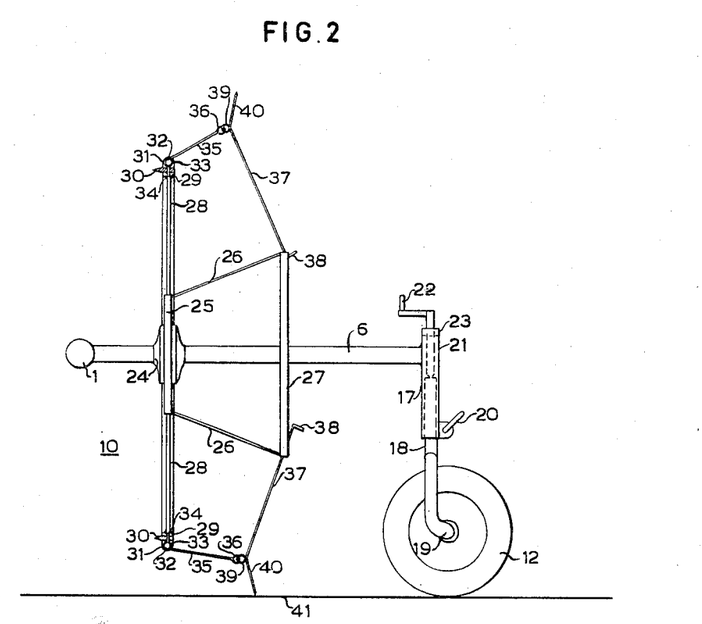
Fig. 2 is an axial sectional view through section line 2—2 in Fig. 1 of one of the raking members embodying the present invention and of the related supporting structure of the device in Fig. 1.
Figure 2A:
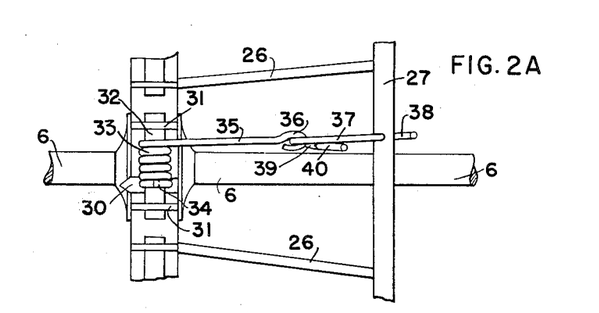
Fig. 2A is an enlarged fragmentary plan view of the raking members shown in Figure 2.

The construction of a raking member in accordance with one embodiment of this invention, and the rearrangement of the running wheel 12 are illustrated in Fig. 2, which shows that the axle 6 of the raking member 10 is connected, at its rear end, with a vertical tube 17 serving as a bearing for a vertical axle 18 which is integral with the horizontal axle 19 of the running wheel 12. A clamping device 20 is provided for preventing rotation of the axle 18 within the tube 17. Further, the upper end of the axle 18 abuts against the lower end of a threaded rod 21 which cooperates with a nut 23 fixed upon the upper end of the tube 17. The threaded rod 21 has a crank 22 at its upper end which may be manually turned for effecting vertical movement of the rod 21, and hence of the axle 18 engaged against the lower end of the latter.

The raking member 10, in accordance with this invention, comprises a hub 24 rotatably mounted on the axle 6 and carrying a circular disc 25. The periphery of the disc 25 is connected, as hereinafter indicated, to a concentric ring 27, which may be bent from a strip of metal. The disc 25 is connected to the ring 27 by means of a plurality of rods 26, of which only those situated in the plane of the drawing have been shown. Further, the periphery of the disc 25 is connected, by means of spokes 28, to a rim 29 which is also concentric to the axis of rotation of the hub 24, but which is situated in the plane of the disc 25, while the ring 27 is axially displaced from the plane of the disc 25. The rim 29 is provided, at one side, with a number of projections 30 which serve as catching elements for the material to be raked. The rim 29 is also provided with a plurality of apertured projections 31. A pin 32 extends through the apertures of each two adjacent projections 31, and a helical spring 33 is mounted on each of the pins 32. One end 34 of each helical spring 33 extends through a related aperture in the rim 29, while the other end of the helical spring is integral with a straight steel wire 35 extending generally in the backward direction and terminating in an eyelet 36.

Steel wires 37 extend outwardly through apertures in the ring 27, and each wire is provided, at its inner end, with a bent hook 38 to prevent the removal thereof from the related aperture in the ring 27. A loop 39 is formed in each steel wire 37 and engages the eyelet 36 of a related steel wire 35. The free end portion of each wire 37 defines a tooth 40 extending beyond the loop 39 and forming an angle with the other part of the wire 37. Due to this arrangement and to the freedom of movement which the steel wire 37 has by reason of its hinged connection with the wire 35, the raked material will readily drop off each tooth 40 as the latter moves upwardly. The upper portion of Fig. 2 illustrates the normal position of a wire 35, while the lower part of Fig. 2 shows the position of a wire 35 when the spring 33 has been elastically deformed by the engagement of the ground 41 with the tooth 40 to cause upward deflection of the latter. As a result of such upward deflection of the tooth 40, the related wire 37 has been moved, to a certain extent, radially inward through the associated aperture in the ring 27.

While the deflection of the tooth 40 is permitted by the turning of the steel wire 35 about the axis defined by the related pin 32, the steel wire 35 also serves as a supporting member for the tooth 40, and the tooth is thereby kept in a favorable position for the raking operation by the engagement of the related wire 37 in the aperture of ring 27.

In the raking device illustrated in Fig. 1, it is to be understood that the running wheel 11 may be supported in the same manner as that described in connection with the running wheel 12, and the raking members 7, 8 and 9 may have the same construction as that described in connection with the raking member 10 of Fig. 2.

When raking with the device shown in Figs. 1 and 2, the greater part of the material to be raked will be displaced by the rim 29, the spokes 28 and the projections 30. Each of the raking members is rotated by the contact of the teeth 40 thereof with the ground and/or the materials lying on the latter, as well as by the contact of the rim 29, the spokes 28 and the teeth 30 with the material accumulated in front of the raking member. The teeth 40 serve, at the same time, to displace material which is situated too low for engagement by the projections 30, or which is detained by stubble or the like, so that it is not acted upon by the rim 29. If the terrain is not left completely bare of rakable material following the passage of the raking device thereover, the elevation of the axles 3 and 6 above the ground 41 can be reduced, by rotation of the associated crank 22. The running wheels 11 and 12 of a raking device having raking members constructed in accordance with the present invention may be provided with pneumatic tires and/or other resilient means may be provided at the running wheels, or at the connections of the axles thereof with the frame, in order to reduce the shocks imposed upon the frame during the movement thereof. It is also possible to connect the running wheels of the raking device to the frame thereof by means of a member which does not extend through the hub of one of the raking members as shown in Morrill Patent No. 2,447,354. Further, it is possible to connect the axles 4 and 5, which support the raking members 8 and 9, respectively, to the frame in a movable or resilient way, for example, by means of cranks as shown in British Patent No. 680,537, so that, even when the terrain is very uneven, a perfect raking operation will be assured. If the running wheels 11 and 12 are connected to the frame 1 in a manner other than by the axles 3 and 6 supporting the raking members 7 and 10, the raking wheels 7 and 10 may be movably or resiliently connected to the frame. It will be understood that any number, and any suitable arrangement of the raking members embodying this invention may be adopted, more specifically, the raking members may be used in a side delivery rake, as in Figs. 1 and 2, in a swath turner or in a similar device. In all such devices, the construction of the raking members described in connection with Fig. 2 may be replaced by other embodiments of the invention, a number of which are hereinafter described in detail.

Figures 3, 7, 10, 11, 12:
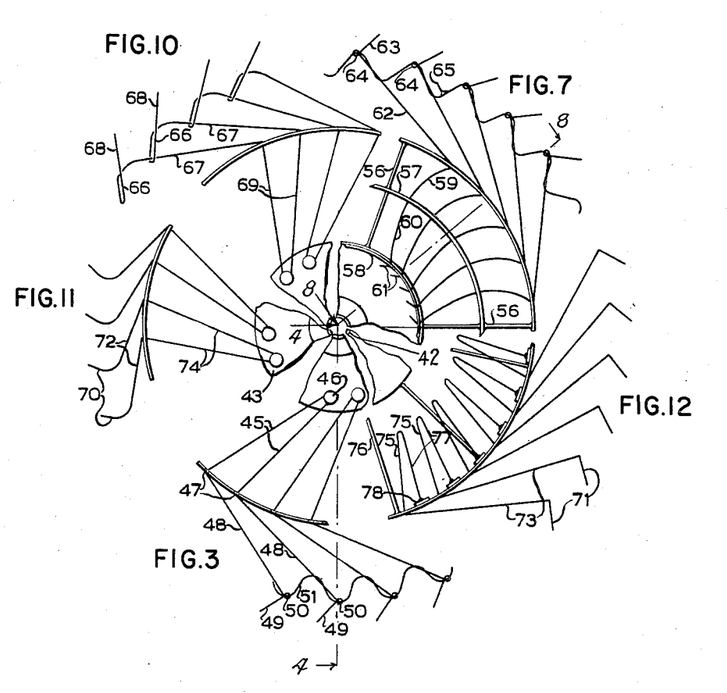
Fig. 3 is a fragmentary, front elevational view of a raking member constructed in accordance with another embodiment of this invention.
Fig. 7 is a fragmentary, front elevational view of a raking member constructed in accordance with still another embodiment of the present invention.
Fig. 10 is a fragmentary, front elevational view of a raking member constructed in accordance with still another embodiment of the present invention.
Fig. 11 is a fragmentary, front elevational view of a raking member constructed in accordance with still another embodiment of this invention.
Fig. 12 is a fragmentary, front elevational view of a raking member constructed in accordance with yet another embodiment of this invention.
Figure 4:
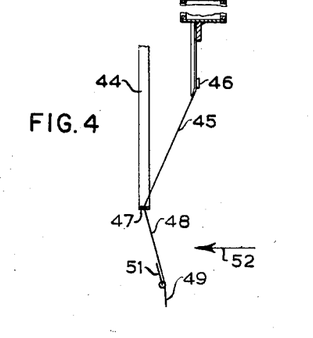
Fig. 4 is a fragmentary, axial sectional view through section line 4—4 in Fig. 3 of the raking member of Fig. 3.

In the embodiment of Figs. 3 and 4, a raking member is provided with a hub 42 carrying a circular disc 43. A rim 44, provided with a plurality of apertures, and concentric with the axes of rotation of the hub 42, is located in a plane situated axially behind the plane of the disc 43. In the embodiment of Figs. 3 and 4, each tooth of the raking member is connected by a related supporting member to means providing torsion means for the tooth, the tooth, supporting member and axis providing means being bent from a single piece of steel wire of, for example, a thickness of four mm. The torsion means 45 for two adjacent teeth are integral with each other and are joined together at a bent part which is secured under the head of a bolt 46 at the periphery of the disc 43. The torsion means 45 extend through apertures 47 in the rim 44, each of the apertures 47 defining a bearing for one of the torsion means 45. Beyond the rim 44, each steel wire is bent substantially at right angles to hold the rim 44 against radial movement relative to the axis of hub 42, while permitting the rim 44 to respond to heavy loads by deflecting elastically out of its normally radially extending plane. The portions of the steel wires which are bent at right angles outside of the rim 44 form supporting members 48 for the teeth 49 which are defined by the extremities of steel wires. The extremities of the steel wires defining the teeth 49 are bent substantially at right angles to the related supporting members 48. Each integral structure made up of a tooth 49, a supporting member 48 and a torsion means 45 is somewhat Z-shaped, however, the tooth 49 and the related torsion means 45 of each structure, shown in Fig. 3, to be in substantially parallel relation, are actually not located in the same plane. Preferably, each supporting member 48 forms such an angle with the plane of the rim 44 that the tooth 49 is located in a plane lying between the plane of the rim 44 and the plane of the disc 43 (Fig. 4). At the transition between each supporting member 48 and the related tooth 49, the steel wire is formed with a loop 50. The loops 50 at the root ends of the several teeth 49 embrace an undulated endless steel wire 51, and the loops of the successive wires are spaced apart by a distance corresponding to the length of each undulation of the wire 51. The wire 51 and the supporting members 48 are inclined from the rim so as to rotate substantially on the surface of a cone having its axis in the axis of rotation of the raking member and its apex opposite the hub from the rim.

Figure 5:
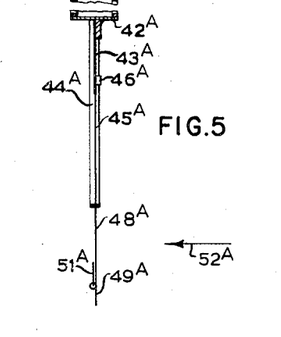
Fig. 5 is a view similar to Fig. 4, but illustrating a modification of the raking member shown in Figs. 3 and 4.

Fig. 5 shows a modification or alternative construction of the embodiment illustrated in Figs. 3 and 4. In Fig. 5, the various parts of the illustrated raking member have been identified by the reference numerals employed in connection with the corresponding parts in Figs. 3 and 4, but with the letter A appended thereto. In the raking member of Fig. 5, the rim 44A, the torsion means 45A, bolt 46A, raking tooth 49A, the endless steel wire 51A, and the supporting members 48A are all located substantially in the plane of the disc 43A.

Figure 6:
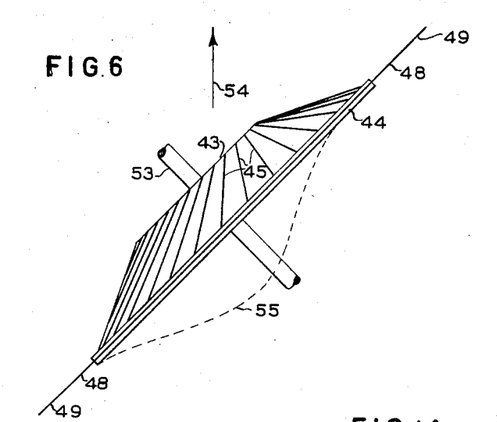
Fig. 6 is a diagrammatic view illustrating the operation of the raking member shown in Figs. 3 and 4.

The operation of the raking member illustrated in Figs. 3 and 4, is as follows:

The material to be raked, in approaching the raking member from the direction indicated in Fig. 4 by the arrow 52, forces the teeth 49 backwards in a manner which has been indicated more clearly in Fig. 6. In Fig. 6, which is merely diagrammatic, the raking member rotates about the axis 53 and moves in the direction of the arrow 54. In their undeflected positions, all of the teeth 49 are situated upon a circle. In order to simplify the illustration of operation in Fig. 6, it has been assumed that the circle containing the teeth 49 and the supporting members 48 all lie in the plane of the rim 44, as in Fig. 5, although, as is apparent in Fig. 4, this need not be the actual case. Due to the contact of the lowermost teeth with the ground, these teeth are deflected out of the circle containing the other teeth during the operation of the raking member, and the deflected lowermost teeth are caused to lie upon a curved line 55 in a plane which is at right angles to the plane of the circle containing the other non-deflected teeth. The deflection of a tooth 49 is very easily effected by reason of the relatively great length of the supporting member 48, which results in the spacing of the tooth 49 a relatively large distance from its torsion means 45, as well as by reason of the great length of the torsion means 45 which is rigidly fixed to the disc 43 at its inner ends and acts as a torsion bar. The position of the torsion means 45 relative to the axis 53 of the hub is such that, even with a small angular displacement of the supporting member 48 about the related torsion means 45, a certain adaptation to the ground will be obtained, more extensive adaptations to the contours of the ground requiring an angular displacement which is proportionately greater. While the torsion means 45 and the supporting members 48, and their arrangement and fixation thereby permit deflection of the teeth 49 in a favorable manner, the same elements together with their connection to the associated teeth form, at the same time, means causing the teeth, upon deflection, to remain substantially at right angles to the axis 53 of the raking member and thus to have a favorable position for raking over the ground. The raking action, which is due to the rotation of the raking member during its bodily movement in the direction of the arrow 54, is effected with regard to the ground in a direction practically coinciding with the direction of the axis 53. By adopting a suitable shape for the teeth 49 and the related supporting members 48 and torsion means 45, it is even possible to obtain an operation whereby the teeth, upon deflection, have the tendency to turn automatically in the direction pointing their ends or points more forwardly, and this tendency compensates for the elastic bending of the tooth and the bending and twisting of the related supporting member 48, which deformations or elastic bending would otherwise have the tendency to keep the point of the tooth in a trailing position.

During deflection, the successive teeth 49 remain interconnected by the undulated steel wire 51. As a result of such interconnection, the distance between the loops 50 at the roots of the adjacent teeth 49 cannot appreciably exceed the length of an undulation of the wire, although a certain expansion of the distance between the successive teeth is permitted, for example, by elastic deformation of the wire 51 in the direction causing stretching of the undulations of the latter. Consequently, upon deflection of the teeth, large gaps between the teeth are avoided, and little or no material can slip therebetween. Moreover, the wire 51 prevents the penetration of material from between the ends of the teeth 49 into the space between the adjacent supporting members 48.

The raking member shown in Fig. 5 operates substantially in the same manner as that described above in connection with Figs. 3 and 4, and has the same advantages. Further, a raking member constructed in accordance with the embodiment of Fig. 5 is particularly adapted for use when the torsion means of the raking member is somewhat downwardly inclined in the forward direction.

Figure 8:
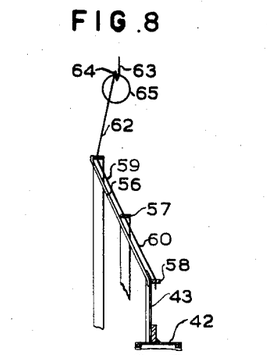
Fig. 8 is a fragmentary, axial sectional view through section line 8—8 in Fig. 7 of the raking member shown in Fig. 7.

In Figs. 7 and 8, still another construction of a raking member has been shown wherein the rim 44 is more or less rigidly connected to the disc 43 by means of spokes 56. The spokes 56 further carry an intermediate rim 57 which is provided with the same number of apertures as the rim 44. The disc 43, in the embodiment of Figs. 7 and 8, has a flange 58 adjacent its periphery which is also provided with apertures. A bent steel wire is introduced into each group of three apertures, each group being made up of one aperture of the rim 44, an aperture of the intermediate rim 57, and an aperture of the flange 58, however, the three apertures included in each group are not in radial alignment with each other. The portion 59 of the steel wire which is located between the rims 44 and 57 defines the torsion means for the related tooth, while the portion 60 of the wire between the rim 57 and the flange 58 may be considered as an arm tending to keep the axis 59 in a definite position. The inner end 61 of the portion 60 is bent at right angles at the radially inner side of the flange 58 in order to prevent removal of the inner end of the wire from the aperture in the flange. The torsion means 59 extends through the rim 44 and the steel wire is there bent so as to form a supporting member 62 for the tooth 63, the member 62 being disposed substantially at right angles to the related torsion means 59. The steel wire from which the parts 59, 60, 62 and 63 are all formed, includes, between the supporting members 62 and the tooth 63, a loop 64 with which the wire engages an endless helical spring 65 having a large pitch, and also made of steel wire. As a result of this arrangement, and apart from the elastic deformation of the spring 65 and other small or negligible displacements, the distance between the loops 64 of the successive wires remains about equal to the pitch of the helical spring 65, so that the latter has a function similar to that of the undulated steel wire 51 in Figs. 3, 4 and 5.

Figure 9:
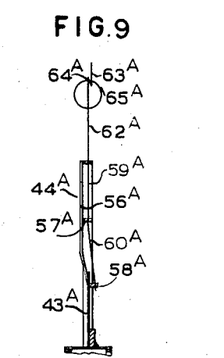
Fig. 9 is a view similar to Fig. 8, but illustrating a modification of the raking member shown in Figs. 7 and 8.

In the embodiment of Fig. 9, wherein the various parts are identified by the same reference numerals employed in connection with the corresponding parts in Figs. 7 and 8, but with the letter A appended thereto, the various parts of the raking members of Figs. 7 and 8 are all disposed in substantially one radial plane. Thus, in Fig. 9, the rims 44A and 57A, the torsion means 59A, the securing portions 60A, the supporting members 62A, the spokes 56A, the flange 58A, a loop 64A, the helical spring 65A and the teeth 63A are all disposed in the radial plane passing through the disc 43A of the raking member.

In the embodiment of the invention illustrated in Fig. 10, the penetration of rakable substance from the teeth into the space between the related supporting members is avoided by a special configuration of connections 66 between the supporting members 67 and the associated teeth 68, rather than by separate members, such as the wire 51 (Fig. 3) or helical spring 65 (Fig. 7). Each connection 66 consists of a loop extending from the related supporting member 67 in the direction opposed to the tooth 68. Each loop 66, the ends of which may be intertwined or otherwise secured together, if desired, embraces the supporting member 67 of an adjacent tooth. The torsion means 69 of the supporting members 67, in Fig. 10, are arranged in the same manner as the torsion means 45 of the embodiment illustrated in Figs. 3 and 4.

Figs. 11 and 12 respectively show two embodiments of the invention in which no provision is made for preventing the penetration of breakable substance from the teeth into the space between adjacent supporting members. If the raking member is adjusted so as to be disposed at a favorable elevation above the ground, the teeth 70 of the embodiment in Fig. 11 or the teeth 71 of the embodiment in Fig. 12 will only engage a small quantity of the rakable substance since the greater part of the rakable substance is displaced by the rim 44 and by the parts of the raking member located within the rim. The above mentioned small quantity of rakable substance engaged by the teeth 70 or 71 drops from the latter before the teeth and the related supporting members 72 and 73, respectively, have reached a rotated position in which the raked material could move downwardly along the supporting members to the rim 44. It will be seen that each steel wire forming a tooth 70, a supporting member 72 and a torsion means 74 in Fig. 11 has a curved or rounded configuration at the connection between the tooth 70 and the related supporting member 72, while the corresponding wires in Fig. 12 have sharp bends between the teeth 71 and the related supporting members 73. The embodiments illustrated in Figs. 11 and 12, respectively, are very useful, provided that the parts thereof are properly dimensioned. In order to keep the teeth in the embodiments of Figs. 11 and 12 situated in a single plane so long as they are not under load, and therefore not deflected, it is desirable to provide abutment on the rim 44 (not shown) against which the supporting members rest as a result of a relatively small torsional prestressing of the torsion means 74 and 75.

The arrangement of the torsion means 74 for the teeth 70 in Fig. 11 corresponds to that of the torsion means 45 in the embodiment of Figs. 3 and 4. However, the torsion means 75 for the supporting members 73 of the embodiment in Fig. 12 have a different construction. The torsion means 75 pass through openings in the rim 44 which, in the embodiment of Fig. 12, is connected to the disc 43 by more or less rigid spokes 76. The steel wires, which in part define the torsion means 75, are reverted or bent back at the inner ends of the torsion means 75 to form wire portions 77, and the outer ends of the wire portions 77 are bent and clamped against the inner surface of the rim 44, by means of clamping members 78. As a result of the above construction, each torsion means 75, as far as its torsional stiffness is concerned, behaves approximately like an axis which is rigidly fixed at one end and has a length equal to the sum of the lengths of both portions 75 and 77.

Figure 13:
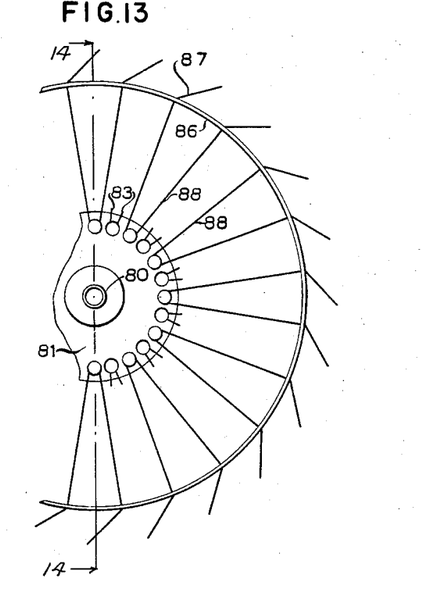
Fig. 13 is a fragmentary front elevational view of part of a raking member constructed in accordance with still another embodiment of this invention.
Figure 14:
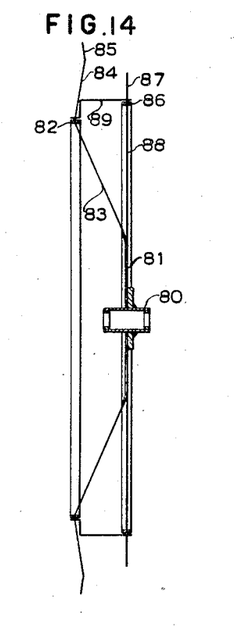
Fig. 14 is an axial sectional view through section line 14—14 in Fig. 13 of the complete raking member embodying the part illustrated in Fig. 13.

In Figs. 13 and 14, a raking member embodying this invention is shown to include a hub 80 carrying a disc 81 and a concentric rim 82 located axially behind the disc 81. The wire portions which define the torsion means 83 for the several teeth are fixed to the periphery of the disc 81 and extend through apertures in the rim 82. At the outside of the rim 82, are disposed supporting members 84 which are integral with the torsion means 83 and bent or angularly disposed relative to the latter. Teeth 85 are integral with the supporting members 84 at the outer ends of the latter. Up to this point, the construction in Figs. 13 and 14 corresponds substantially to a previously described embodiment, for example, that of Fig. 11, however, the embodiment of Figs. 13 and 14 additionally includes a second apertured rim 86 concentric to the rim 82, but arranged in front of the latter (Fig. 14). Steel wires 88 are secured, at their inner ends, to the disc 81 and extend radially outward from the latter through the apertures in the rim 86 to serve as torsion means for teeth 87 which are integral with the outer ends of the wires 88 and are arranged at an angle to the axes defining portions of the latter. It is desirable to provide a number of generally axially extending strips 89 between the rims 82 and 86 in order to prevent the penetration of breakable material into the space between the rim. However, the strips 89 do not prevent the rims 82 and 86 from deflecting elastically together. The teeth 87 form a rough preraking device, while the teeth 85 form a fine raking device. The same result may also be obtained by making use of two separate raking members, at least one of which is constructed in accordance with the previously described embodiment of this invention. The two separate raking members for rough preraking and for fine raking, respectively, may be mounted on the same axle with separate hubs for individual rotation, or they may be connected together in such a manner that they rotate at the same angular velocity.

Figures 15, 17, 19:
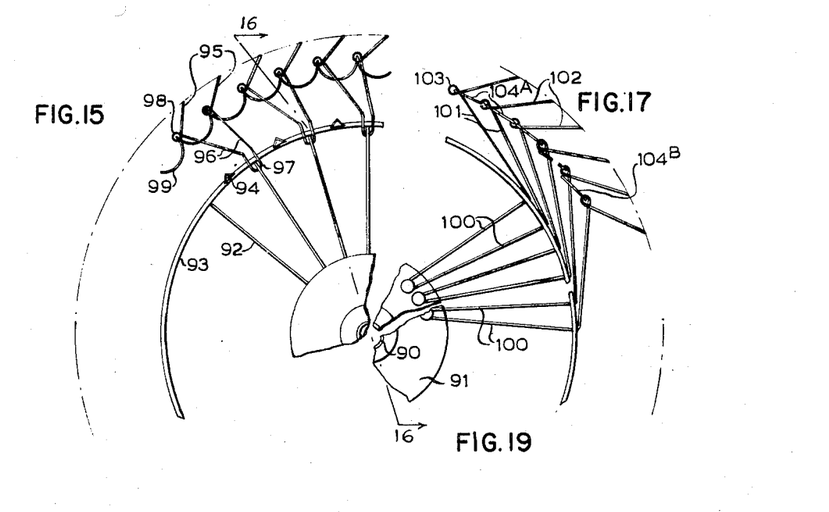
Fig. 15 is a fragmentary, front elevational view of a raking member constructed in accordance with still another embodiment of this invention.
Fig. 17 is a fragmentary, front elevational view of a raking member constructed in accordance with still another embodiment of this invention.
Fig. 19 is a view similar to Fig. 17, but showing a modification of the arrangement illustrated in the latter.
Figure 16:
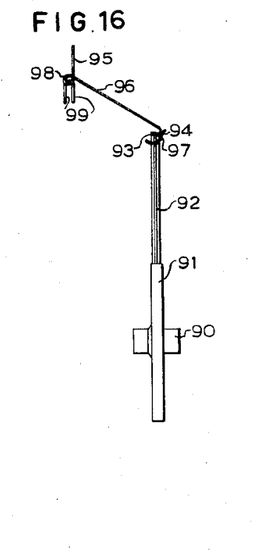
Fig. 16 is a fragmentary, axial sectional view through section line 16—16 in Fig. 15 of the raking member shown in Fig. 15.

Referring now to Figs. 15 and 16, a raking member embodying this invention is there shown to define a hub 90 carrying a disc 91 from which radial spokes 92 extend for connection, at their outer ends, to a rim 93. The rim 93, at its front side, is provided with a series of projections 94 acting as catching members for the material to be raked. The rim 93, the spokes 92, and the projections 94 operate as a rough preraking member, while the fine raking is effected by teeth 95 which are formed in pairs from a single piece of steel wire. The parts of the single piece of steel wire between the pair of teeth 95 defines two supporting members 96, while the connection or middle part 97 between the supporting members 96 has a central bend in a plane which is substantially parallel to the plane containing both supporting members 96 and two side bends which are curved oppositely to the central bend and are disposed in planes normal to the plane of the central bend. The teeth forming wires are each assembled on the rim 93 so that the central bend thereof embraces a related spoke 92, while the related side bend embraces the rim 93 at the opposite sides of the related spoke 92. Between each of the teeth 95 and the related supporting member 96, a loop 98 is formed in the wire and embraces an endless steel wire 99. The wire 99 is formed with as many semi-circular curvatures as there are teeth 95 on the raking member. These semi-circular curvatures are situated in two parallel planes (see Fig. 16), with the successive curvatures being alternately located in different planes and being connected together by a short bent portion having a semi-circular configuration and lying in a plane passing through the axis of rotation of the raking member.

The loops 98 at the roots of the teeth 95 embrace the circumferential wire (99) at the bent portions of the latter defining the connections between the successive semi-circular curved portions of the wire 99. The normal operation of the embodiment of Figs. 15 and 16 should be apparent from the above description of the structure thereof and, it is believed, requires no further explanation. However, it should be noted that, although the supporting members 96 for the teeth 95 are substantially rotatable about axes which are virtually tangent to the rim 93, at the locations of the related connecting portions 97, and although the supporting members 96 can be arranged coplanar with the axis of rotation of the raking member, the raking member of Figs. 15 and 16 can be moved over the terrain in either the forward or backward direction without permanently deforming any of the parts thereof. Such permanent deformation of the parts of the raking member during backward movement thereof is prevented by the fact that each pair of teeth formed from a single wire may be deflected radially inward by sliding of the middle portion or connection 97 of the wire radially inward along the related spoke 92. Following such deflection, the circumferential steel wire 99 causes all of the parts to return to their normal positions.

Figure 18:
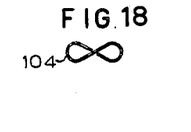
Fig. 18 is a detail view of a member employed in the embodiment of Fig. 17.

According to the embodiment of the invention shown in Figs. 17 and 18, the rim 93 is connected to the disc 91 upon hub 90 by steel wires 100 in a manner already described herein, for example, as in Figs. 3, 10 and 11. The wires 100 extend through apertures in the related rim 93 and, at the outside of the rim, are bent so as to form supporting members 101 for teeth 102 at the outer ends of the steel wires. Each wire is formed with a loop 103 between the tooth 102 and the related supporting member 101.

In order to limit the distance or spacing between the successive teeth, links 104 (Fig. 18) which are bent from a piece of steel wire in the shape of a figure 8 are employed. In the embodiment of Fig. 17, the links, indicated at 104A, engage the successive loops 103, while in the embodiment of Fig. 19, the links, indicated at 104B, engage a loop 103 at one side and a supporting member 101 of the adjacent tooth forming wire at the other side. In both cases, the links serve to establish the greatest distance that may occur between adjacent teeth.

Although the raking teeth of all of the previously described embodiments of the invention are either inclined forwardly in the direction of rotation of the raking member or, as in Fig. 2, disposed in planes passing through the axis of rotation of the raking member, it is to be understood that raking members embodying the present invention may have the teeth thereof inclined backwardly relative to the direction of rotation of the related raking member. In the latter case, it will be necessary to provide means for maintaining the teeth in a favorable position for raking, for example, by securing the teeth to a crown (not shown). Further, while the supporting members for the teeth in all of the described embodiments of the invention have been rectilinear, it is to be understood that arcuate supporting members may be advantageously employed for certain situations.

Although various embodiments of the invention have been described in detail herein and illustrated in the drawings, merely by way of example, it is to be understood that the invention is not limited to such particular embodiments, and that various changes and modifications may be effected therein without departing from the spirit or scope of the invention, as defined in the appended claims.

What we claim is:

1. A raking member comprising a hub rotatable about an axis, a rim member having radial openings therethrough, spaced from said hub and substantially concentric therewith, resilient rods attached to said hub and each having a first portion extending through said openings in said rim member, said resilient rods each having a second portion on the outside of said rim member extending substantially normally to said first portion, and said resilient rods each having a third raking portion extending outwardly from said second portion.

2. A raking member comprising a hub rotatable about an axis, a rim member, resilient rods attached to said hub and each having a first portion extending to said rim member, said resilient rods each having a second portion on the outside of said rim member extending substantially normally to said first portion, said resilient rods each having a third raking portion terminating in raking teeth extending outwardly from said second portion, said resilient rods forming torsion means for said teeth.

3. A raking member according to claim 2 wherein the second and third portions of said rod are substantially normal to each other.

4. A raking member according to claim 2 wherein the second and third portions of said rod have at their conversion a curved shape.

5. A raking member according to claim 2 wherein the third portion of said rod is rearwardly directed with respect to the intended direction of rotation of the rake wheel and the second portion is directed forwardly.

6. A raking member according to claim 2 wherein the first and third portions of said rod have substantially the same direction.

7. A raking member according to claim 2 wherein said raking member is provided with an undulating steel wire and the second and third portions of each resilient rod are connected by a loop in said rod through which extends said undulated steel wire, whereby each rod is held apart from the adjacent rods by the undulations of the steel wire.

8. A raking member comprising a wheel having a peripheral rim, a resilient supporting member operatively associated with said rim and extending at an angle to a radius at the point of association with the rim, a raking tooth extending substantially normally to a terminal portion of said supporting member and outwardly with respect thereto.

9. A raking member according to claim 8 with a plurality of supporting members and raking teeth.

10. A raking member according to claim 8 wherein the terminal portion of the supporting member is hingedly connected to the raking tooth, the raking tooth having an inwardly extending wire which extends towards the axis of the raking member, a rod, a second rim held substantially parallel to the first-mentioned rim by said rod, said second rim having an opening through which said wire extends, said wire having an angular bend whereby to prevent its withdrawal through the opening in said second rim.

11. A raking member according to claim 8 wherein said supporting member comprises a V-shaped resilient rod operatively associated with the rim and at the point of the V.

12. A raking member according to claim 11 wherein said raking member is provided with a coupling member comprising an endless steel wire, said coupling member being operatively associated with the terminal portion of said supporting member.

13. A raking member according to claim 12 wherein the endless steel wire includes a plurality of loops engaging said supporting member.

14. A raking member according to claim 11 wherein said rim is provided with raking projections extending outwardly from said rim.

15. A raking member according to claim 2 wherein there is a second rim member forward of the first-mentioned rim member and concentric to the axis of said hub of the raking member, a second group of resilient rods attached to said hub, each of said second group of rods having a first portion extending to said second rim member and a second portion on the outside of said second-mentioned rim member extending substantially normally to said first portion.

16. A raking member comprising a wheel having a peripheral rim, a plurality of resilient supporting members each operatively associated with said rim and extending at an angle to the radius at the point of association with the rim, a raking tooth extending substantially normally to the terminal portion of each of said supporting members and outwardly with respect thereto, a coupling means coupling at least two of said teeth, said coupling means controlling the distance between said two teeth.

17. A raking member according to claim 16 wherein the coupling means comprises an undulated steel wire.

18. A raking member according to claim 16 wherein the raking teeth define eyelets, said coupling means being connected to said teeth by means of said eyelets.

19. A raking member according to claim 16 wherein all of said teeth on the raking member are connected to said coupling means.

20. A raking member according to claim 16 wherein said coupling means is connected to said teeth through rod means.

References Cited in the file of this patent

UNITED STATES PATENTS

| | | |
|---|---|---|
| Re. 23,411 | Stenzel | Sept. 11, 1951 |
| 2,588,599 | Winter | Mar. 11, 1952 |
| 2,602,280 | Crowe et al. | July 8, 1952 |
| 2,603,053 | Lipe et al. | July 15, 1952 |
| 2,635,411 | Hicks | Apr. 21, 1953 |
| 2,657,519 | Hill | Nov. 3, 1953 |
| 2,680,343 | Enos, Jr. | June 8, 1954 |

FOREIGN PATENTS

| | | |
|---|---|---|
| 674,797 | Great Britain | July 2, 1952 |